United States Patent
Huffman et al.

(10) Patent No.: US 10,893,231 B1
(45) Date of Patent: Jan. 12, 2021

(54) EYE CONTACT ACROSS DIGITAL MEDIUMS

(71) Applicant: International Business Machines Corporation, Armonk, NY (US)

(72) Inventors: Joel Russell Huffman, Austin, TX (US); Stefan A. G. van Der Stockt, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/847,888

(22) Filed: Apr. 14, 2020

(51) Int. Cl.
*H04N 7/14* (2006.01)

(52) U.S. Cl.
CPC .................. *H04N 7/144* (2013.01)

(58) Field of Classification Search
CPC .................. H04N 7/14; H04N 7/15
USPC ............................ 348/14.01–14.16
See application file for complete search history.

(56) References Cited

U.S. PATENT DOCUMENTS

| | | | |
|---|---|---|---|
| 5,359,362 A | 10/1994 | Lewis et al. | |
| 6,208,373 B1* | 3/2001 | Fong | H04N 7/144 348/14.03 |
| 6,393,136 B1 | 5/2002 | Amir | |
| 7,103,211 B1 | 9/2006 | Medioni | |
| 8,994,780 B2 | 3/2015 | Moore | |
| 9,684,953 B2 | 6/2017 | Kuster et al. | |
| 10,423,830 B2 | 9/2019 | Chalom et al. | |
| 2007/0002130 A1 | 1/2007 | Hartkop | |
| 2011/0102553 A1 | 5/2011 | Corcoran | |
| 2015/0009277 A1* | 1/2015 | Kuster | G06T 5/50 348/14.07 |
| 2015/0220773 A1* | 8/2015 | Lucey | H04N 7/15 348/14.16 |
| 2016/0004302 A1 | 1/2016 | Bolle | |

FOREIGN PATENT DOCUMENTS

WO 2019243367 12/2019

OTHER PUBLICATIONS

Gemmell.et al., "Gaze Awareness for Videoconferencing: A Software Approach," IEEE Multimedia, Oct.-Dec. 2000, pp. 26-35.
IBM, "Eye Contact During Video Conferencing," ip.com, IPCOM000177765D, Dec. 30, 2008, 3 pages.
Anonymously, "Auto-Correction of Images of a Participant Eyes in a Virtual Collaboration Session," ip.com, IPCOM000226803D, Apr. 22, 2013, 18 pages.

(Continued)

*Primary Examiner* — Melur Ramakrishnaiah
(74) *Attorney, Agent, or Firm* — VanLeeuwen & VanLeeuwen; Christopher M. Pignato

(57) ABSTRACT

An approach is provided in which the approach initiates a video conference between a first user utilizing a first device and a second user utilizing a second device. The first device uses a camera positioned at a first set of coordinates to capture a first live video feed of the first user from a first alignment perspective, and also displays a second live video feed of the second user on the screen at a second set of coordinates. The approach manipulates the first live video feed such that the manipulated first live video feed captures the first user from a second alignment perspective corresponding to the second set of coordinates, and transmits the manipulated first live video feed to the second device.

20 Claims, 7 Drawing Sheets

(56) References Cited

OTHER PUBLICATIONS

Anonymously, "Method and system for tracking the focus area of a presenter and displaying the same during video conference," ip.com, IPCOM000252958D, Feb. 23, 2018, 3 pages.
Anonymously, "Method and System for Holographic Interaction During Video Conference," ip.com, IPCOM000258824D, Jun. 18, 2019, 5 pages.
Jones et al., "Achieving Eye Contact in a One-to-Many 3D Video Teleconferencing System," USC ICT 3D Teleconferencing SIGGRAPH 2009, 8 pages.
Waizenegger et al., "Model Based 3D Gaze Estimation for Provision of Virtual Eye Contact," 2012 19th IEEE International Conference on Image Processing, Sep. 2012, Orlando, FL, 4 page.
Yang et al., "Eye Gaze Correction with Stereovision for Video-Teleconferencing," Technical Report MSR-TR-2001-119, Microsoft Corporation, Dec. 2001, 15 pages.
Choi, "AI Creates Fake Obama," IEEE Spectrum, Jul. 12, 2017, 5 pages.
Bulat et al., "How far are we from solving the 2D & 3D Face Alignment Problem? (and a dataset of 230,000 3D facial landmarks)," 2015, 2 pages.
Le, "Snapchat's Filters: How computer vision recognizes your face," Feb. 7, 2018, 10 pages.
Thies et al., "FaceVR: Real-Time Gaze-Aware Facial Reenactment in Virtual Reality," ACM Transactions on Graphics (TOG), Article No. 25, Mar. 2018, 16 pages.

\* cited by examiner

EYE CONTACT ACROSS DIGITAL MEDIUMS

BACKGROUND

The advancement of network technology and personal device technology has caused an exponential growth in video conferencing. Video conferencing systems allow users to conduct live audio/video discussions for meetings, training events, lectures, presentations, or personal conversations using a web-connected devices. Video conferencing typically uses Internet based TCP/IP connections and offers data streams of audio and video feeds that are shared simultaneously across geographically dispersed locations.

Users conduct live video conferences using common devices having a microphone, a camera, and a display, such as a desktop computer, a laptop computer, a smart phone, etc. A device's camera is typically located close to the device's display, such as a laptop's camera being located on top/bottom of the display. A video conference participant typically does not look at the participant's camera, but instead looks at live video feeds of other participants that are displayed on the participant's display either in full screen mode or in various viewport windows positioned on the participants display.

BRIEF SUMMARY

According to one embodiment of the present disclosure, an approach is provided in which the approach initiates a video conference between a first user utilizing a first device and a second user utilizing a second device. The first device uses a camera positioned at a first set of coordinates to capture a first live video feed of the first user from a first alignment perspective, and also displays a second live video feed of the second user on the screen at a second set of coordinates. The approach manipulates the first live video feed such that the manipulated first live video feed captures the first user from a second alignment perspective corresponding to the second set of coordinates, and transmits the manipulated first live video feed to the second device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
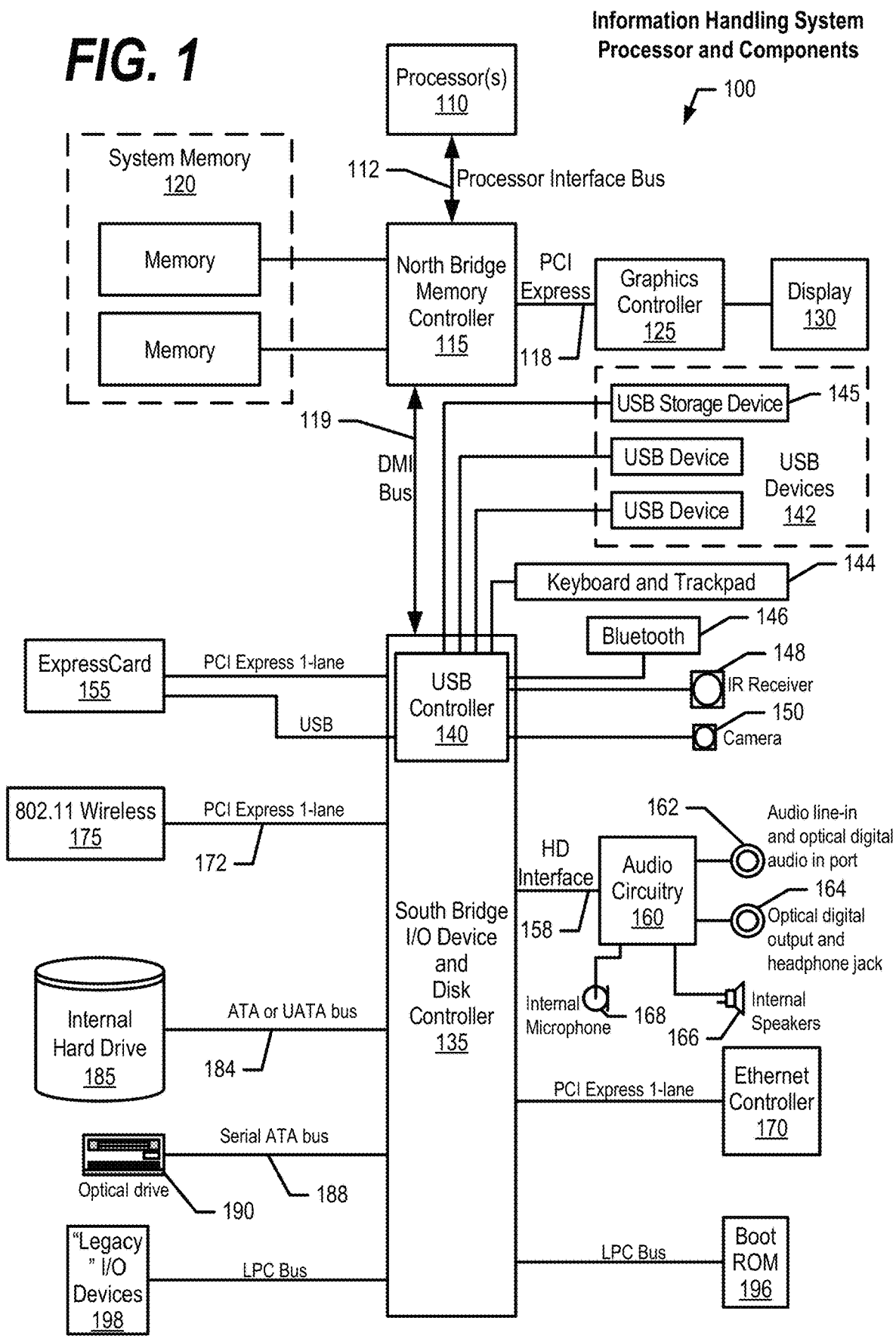
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
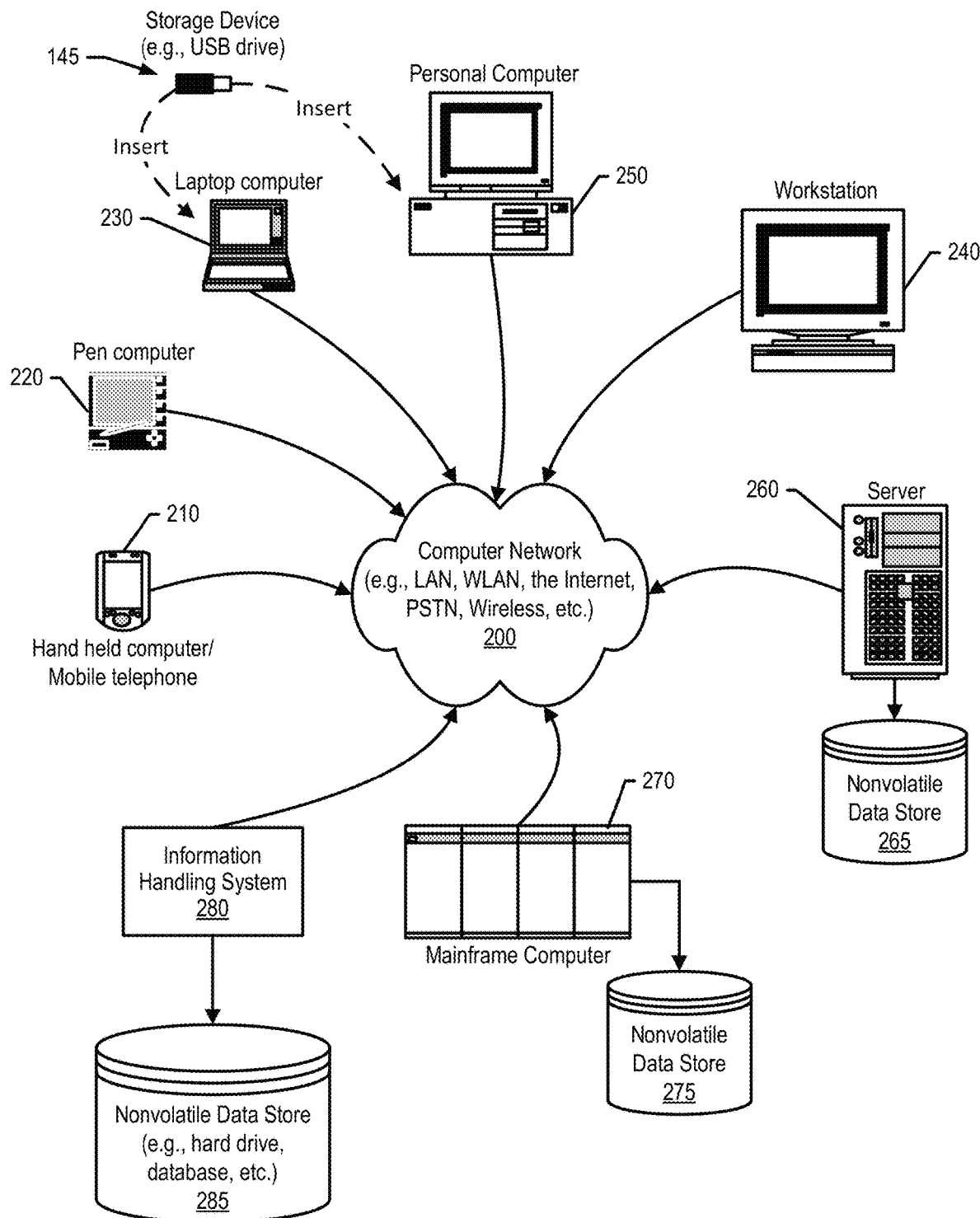
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, a video conference participant typically does not look at the participant's camera, but instead looks at live video feeds of other participants that are displayed on the participant's display either in full screen or in various viewport windows positioned on the participants display. As such, a challenge found is that each user does not appear to "look" at the other users because each user is viewing the other users' live streams on a display instead of looking directly at their respective camera.

Eye contact plays a large role in conversational turn-taking, perceived attention and intent, and other aspects of group communication. While traditional telephone conversations give no eye contact cues, many videoconferencing systems are arguably worse because they provide an incorrect impression that other users are avoiding eye contact due to the offset positioning between the live video feed positioning on a system's display relative to the system's physical camera position.

FIGS. 3 through 7 depict an approach that can be executed on an information handling system that computes a virtual camera position corresponding to a displayed live video feed and manipulates a live video feed of a user based on the virtual camera position relative to a physical camera position. The manipulated video feed, when displayed on a second user's screen, delivers an appearance that the first user is looking at the second user during the video conference. The approach does not utilize eye-tracking software/hardware or other specialized external hardware such as mirrors, multiple cameras, and etcetera.

Figure 3:
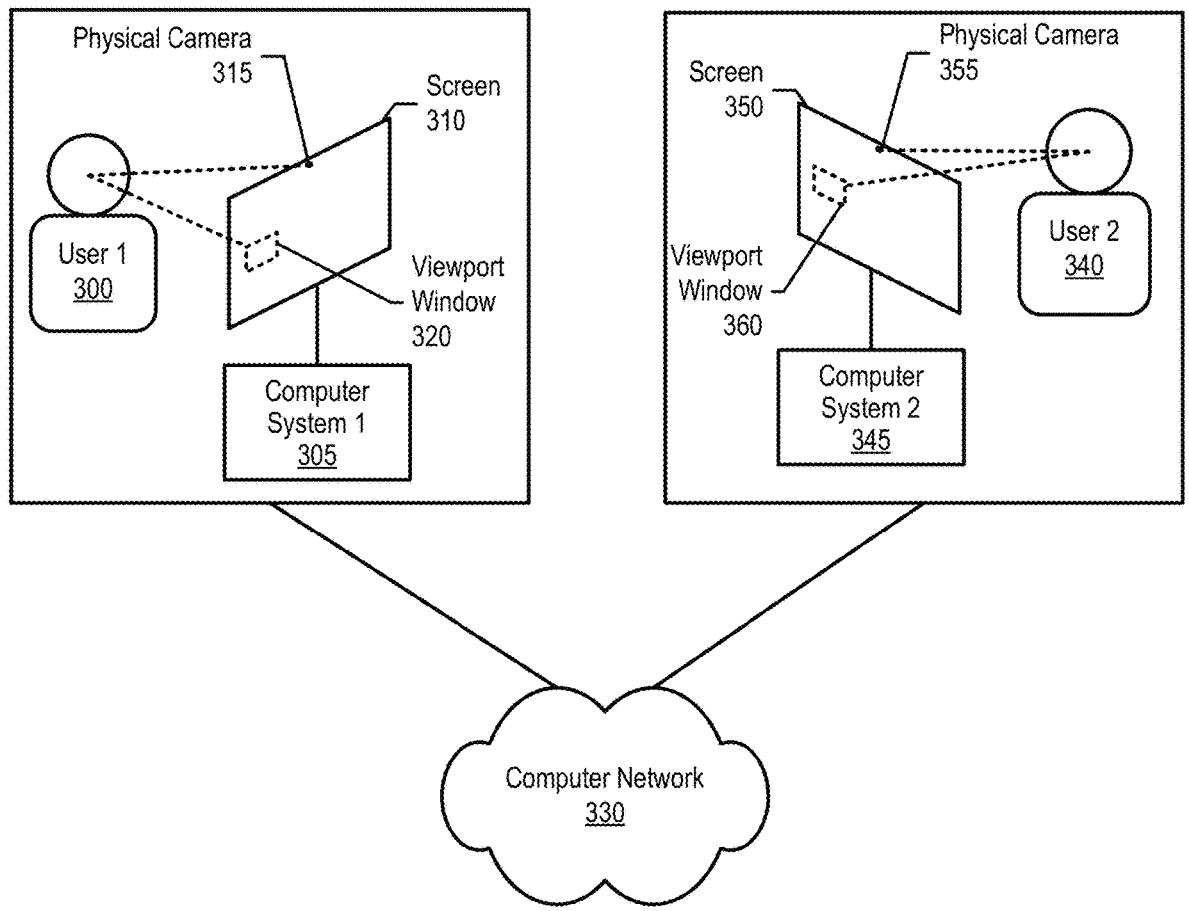
FIG. 3 is an exemplary diagram depicting two users engaging in a video conference using the approach discussed herein.

FIG. 3 is an exemplary diagram depicting two users engaging in a video conference using the approach discussed herein. User 1 300 and user 2 340 are conducting a video conference through computer network 330 using computer system 1 305 and computer system 2 345. Computer system 1 305 includes physical camera 315 and display screen 310, hereinafter referred to as screen 310. Computer system 2 345 includes physical camera 355 and display screen 350, hereinafter referred to as screen 350.

User 1 300 views a live video feed of user 2 340 on viewport window 320 displayed on screen 310. In one embodiment, user 1 300 views the live video feed in full screen mode, in which case the entire screen 310 is considered viewport window 320 in the approach discussed herein. Likewise, user 2 340 views a live video feed of user 1 300 on viewport window 360 displayed on screen 350 and, in one embodiment, user 2 340 views the live video feed in full screen mode, in which case the entire screen 350 is considered viewport window 360 in the approach discussed herein.

During the video conversation, user 1 300 "looks at" user 2 340 via viewport window 320 and, as such, user 1 300's head alignment is directed to viewport window 320. As such, user 1 300 does not look directly at physical camera 315 and, therefore, the live video feed viewed by user 2 340 in viewport window 360 appears to user 2 360 that user 1 300 is not looking directly at user 2 340. As discussed in detail below, computer system 1 305 performs a series of steps to manipulate the live video feed captured by physical camera 315 to adjust the captured alignment perspective of user 1 300 from the location of physical camera 315 to a virtual camera alignment perspective corresponding to viewport window 320 such that user 1 300 appears to look directly at user 2 340 when the live video feed is presented in user 2 340's viewport window 360. In one embodiment, computer system 1 305 uses software drivers to implement the approach discussed herein.

Computer system 1 305 determines x/y coordinates of physical camera 315, referred to herein as PCx and PCy. Computer system 1 305 then identifies a location of user 2 340's face in viewport window 320 on screen 315 and assigns the location as virtual camera position (VCP) coordinates, referred to herein as VCPx and VCPy (see FIG. 5 and corresponding text for further details). Next, computer system 1 305 computes a coordinate offset between PCx/PCy and VCPx/VCPy.

Figure 5:
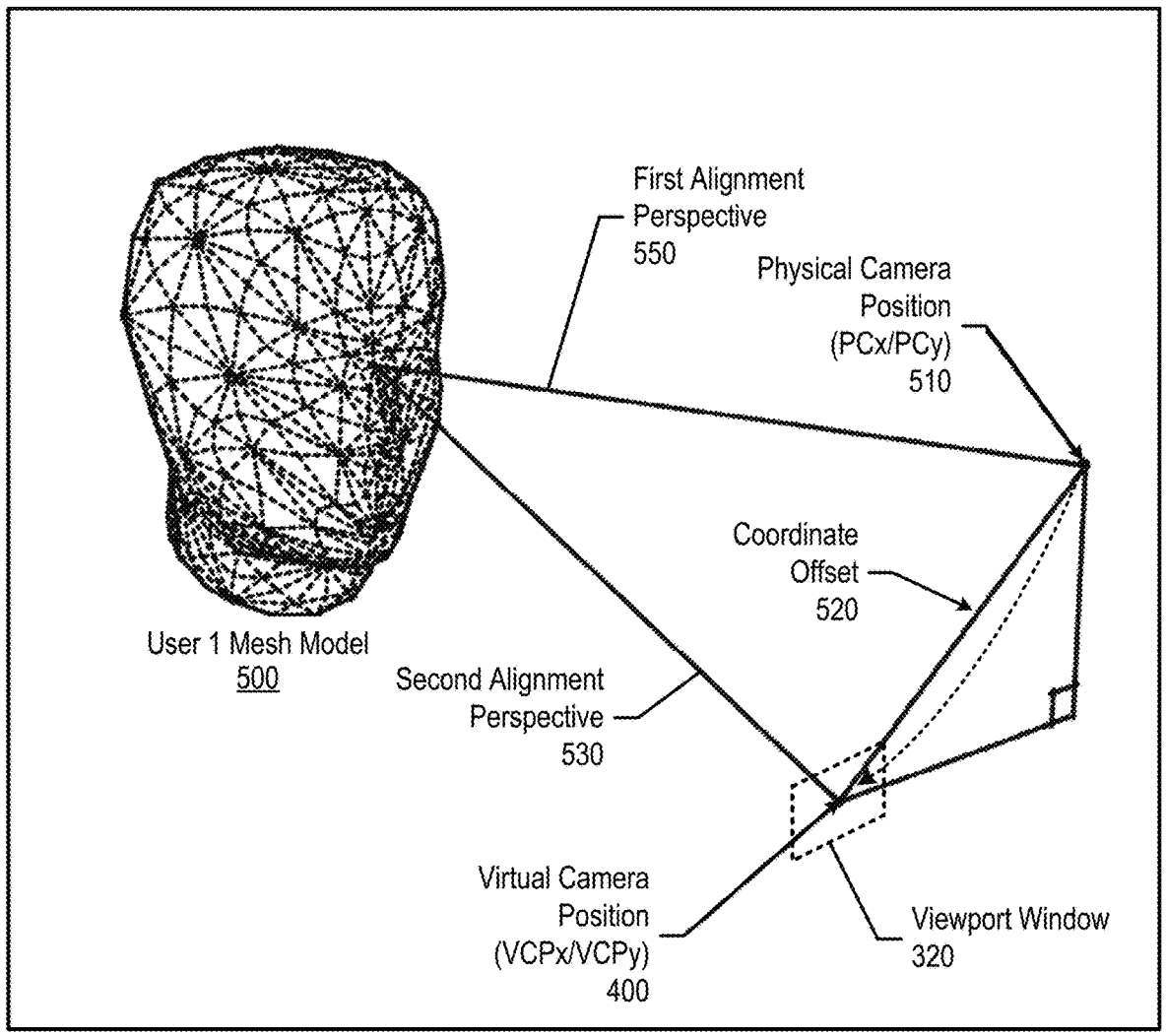
FIG. 5 is an exemplary diagram depicting different alignment perspectives of a mesh model of a user.

Computer system 1 305 then builds a mesh model of user 1 300's head (see FIG. 5 and corresponding text for further details). Next, computer system 1 305 utilizes rotation matrices to rotate the alignment perspective of the mesh model from PCx/PCy towards VCPx/VCPy. Then, computer system 1 305 manipulates the live video feed captured by physical camera 315 based on the different alignment perspective and transmits the manipulated live video feed to computer system 2 345 via computer network 330. Computer system 2 345 then displays the manipulated live video feed in viewport window 360 where user 1 300 appears to be looking directly at user 2 340.

Computer system 2 345 also employs the same techniques to manipulate the live video feed of user 2 340 captured by physical camera 355. Computer system 2 345 then transmits the manipulated live video feed to computer system 1 305 via computer network 330 and computer system 1 305 displays the manipulated live video feed on screen 310 in viewport window 320.

Figure 4:
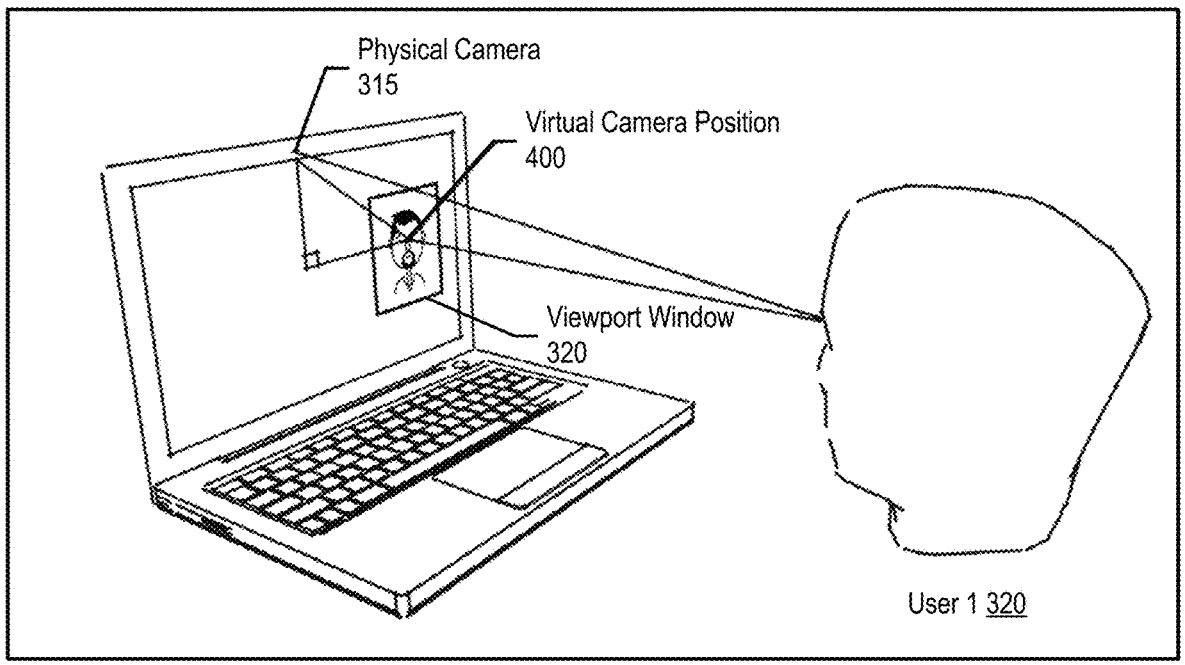
FIG. 4 is an exemplary diagram depicting a first user viewing a first live video feed of a second user while the first user's physical camera captures a second live video feed of the first user.

FIG. 4 is an exemplary diagram depicting physical camera 315 capturing a live video feed of user 1 320 while user 1 320 is conversing with user 2 340 during a video conference. User 1 320 views user 2 340 via viewport window 320. Computer system 1 305 performs a series of computations to identity a set of coordinates on screen 315 that, in one embodiment, is between the eyes of user 2 340. Computer system 1 305 then deems this set of coordinates as virtual camera position 400.

Computer system 1 305 then manipulates the live video feed captured by physical camera 315 by adjusting the perspective of the camera angle from physical camera 315 to virtual camera position 400 (see FIG. 5 and corresponding text for further details). In turn, the manipulated live video feed portrays user 1 320 looking at user 2 340 when the computer system 2 345 displays the manipulated video feed in viewport window 360.

FIG. 5 is an exemplary diagram depicting different alignment perspectives of a mesh model of user 1 300. Computer system 1 305 determines x/y coordinates (PCx/PCy) of physical camera 315, which is physical camera position 510 shown in FIG. 5. Computer system 1 305 then identifies virtual camera position 400 coordinates (VCPx/VCPy) as discussed herein, which corresponds to user 2 340's face displayed in virtual viewport window 320.

Next, computer system 1 305 computes coordinate offset 520, which is the x/y difference between physical camera position 510 and virtual camera position 400. Coordinate offset 520 is the amount of manipulation in the x and y direction that computer system 1 305 changes the alignment perspective of user 1 mesh model 500. As such, physical camera 315 captures a live video feed from first alignment perspective 550, and computer system 1 305 manipulates the live video feed as discussed herein to correspond with second alignment perspective 530. In one embodiment, the process uses a Euclidean translation to manipulate the live video feed.

Figure 6:
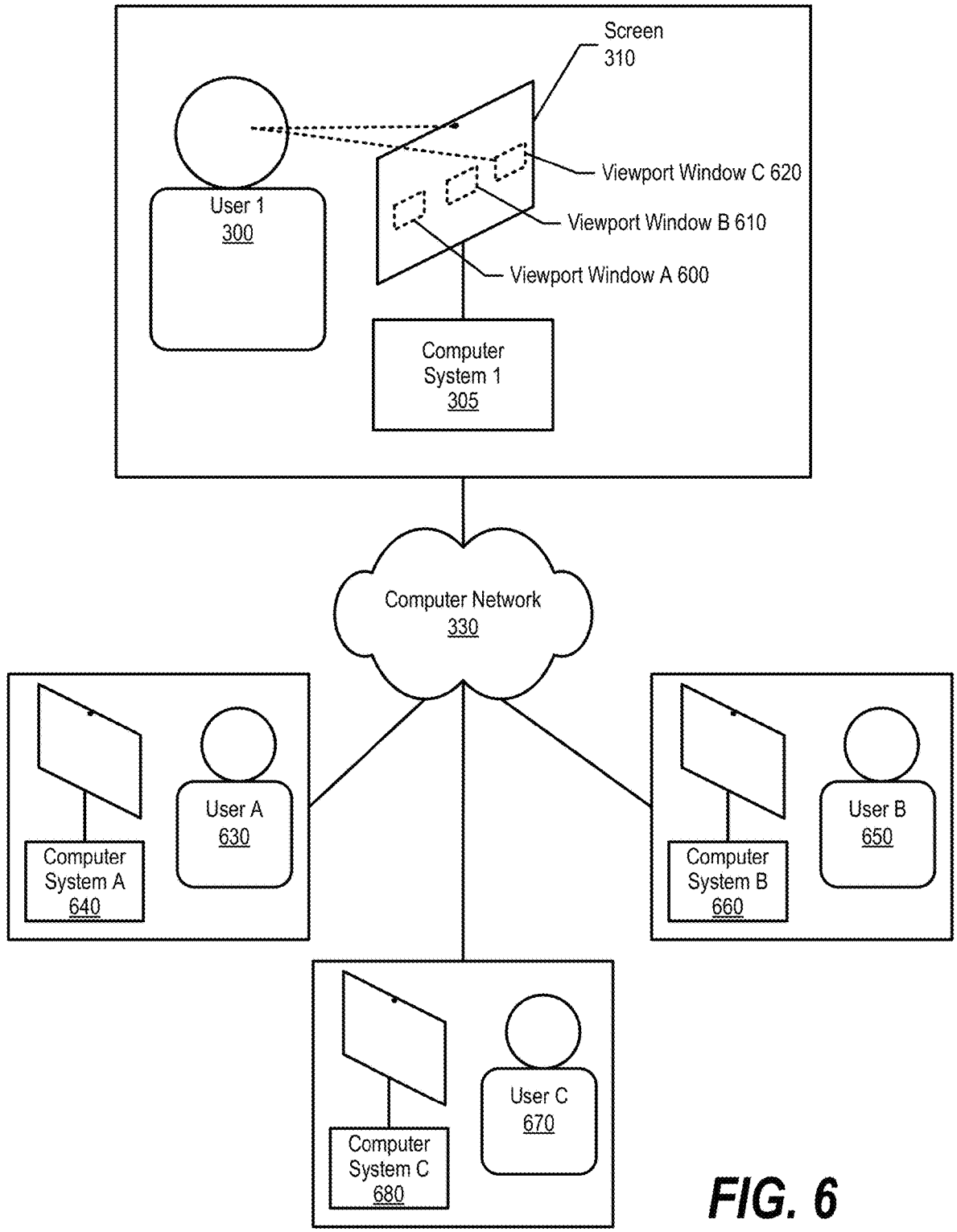
FIG. 6 is an exemplary diagram showing an embodiment of multiple users engaging in a video conference.

FIG. 6 is an exemplary diagram showing an embodiment of multiple users engaging in a video conference. At times, user 1 300 engages in video conferences involving several users A 630, B 650, and C 670 using respective computer systems A 640, B 660, and C 680. Computer system 1 305 displays live video feeds of the multiple users on screen 310 in respective viewport windows A 600, B 610, and C 620.

In one embodiment, the approach discussed herein assigns the virtual camera position to an "active" viewport window user, such as a user that is currently speaking. For example, when user B 650 speaks, computer system 1 305 determines the virtual camera position based on user B 650 in viewport window B 610 and manipulates user 1 300's head alignment in the live video feed accordingly. When user A 630 begins to speak, then computer system 1 305 determines the virtual camera position based on user A 630 in viewport window A 600 and manipulates user 1 300's head alignment in the live video feed accordingly. In another embodiment, computer system 305 uses facial recognition techniques to determine which user's mouth is moving and move the virtual viewport window to the user's viewport window.

Figure 7:
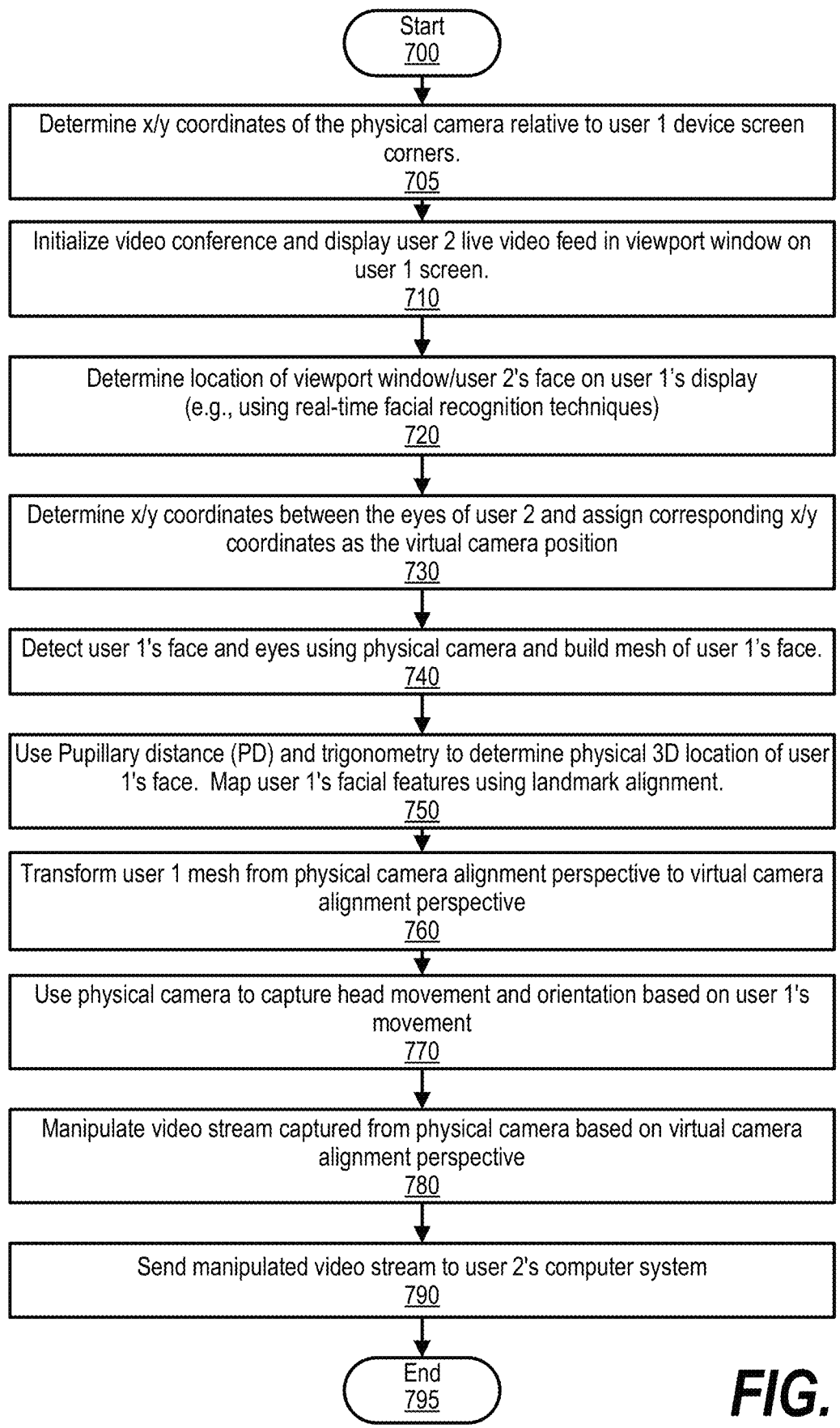
FIG. 7 is an exemplary flowchart showing steps taken to manipulate a live video feed of a user to deliver an appearance to a video conference participant that the user is looking at the participant during a video conference.

FIG. 7 is an exemplary flowchart showing steps taken to manipulate a live video feed of a user to deliver an appearance to a video conference participant that the user is looking at the participant during a video conference. FIG. 7 processing commences at 700 whereupon, at step 705, the process determines x/y coordinates (PCx and PCy) of the device's physical camera (315) relative to a location of the user's screen (e.g., upper right corner). In one embodiment, the process determines the relative coordinates of the physical camera one time and stores the relative location for future video conference sessions.

At step 710, the process initializes a video conference and displays a live video feed of user 2 340 in a viewport window (320) on user 1's screen 310. At step 720, the process determines a location of viewport window 320 and/or user 2 340's face on screen 310, such as by using real-time facial recognition techniques. At step 730, the process determines a set of coordinates between the eyes of user 2 340 on screen 310 based on a pupillary distance and assigns the set of coordinates as the virtual camera position (VCP) VCPx and VCPy.

At step 740, the process detects user 1 300's face and eyes using physical camera 315 and builds a mesh model of user 1 300's face using techniques discussed herein (see FIG. 5 and corresponding text for further details). At step 750, the process uses Pupillary Distance (PD) and trigonometry to determine a physical 3D location of user 1 300's face and maps user 1 300's facial features using landmark alignment. In one embodiment, the process uses a set of sparse 3D points and the view-based patches associated with each point. In this embodiment, the process assumes a weak perspective projection model and iteratively deforms the model and adjusts the 3D pose to fit the image.

At step 760, the process transforms the user 1 300 mesh model from a physical camera alignment perspective to a virtual camera alignment perspective (see FIG. 5 and corresponding text for further details). At step 770, the process uses the physical camera to capture head movements and orientations based on user 1 300's movement.

At step 780, the process manipulates the video stream captured by physical camera 315 based on the virtual camera alignment perspective. In one embodiment, the process initially places a "virtual camera" in a position of the physical camera 315. The process then transposes the virtual camera to the position of the on screen participant (virtual camera position 400) and the virtual camera "sees" the mesh model from a slightly different perspective to create an eye contact effect. In this embodiment, when user 1 300 looks elsewhere on the screen, eye contact is broken and makes the video conference more "natural."

In another embodiment, pixel data of user 1 300 (facial features) is texture mapped onto the mesh model and rendered as a bitmap that is transmitted to user 2 340. In this embodiment, the texture map is an image applied (mapped) to the surface of a shape or polygon. The texture map may be a bitmap image or a procedural texture that may be stored in common image file formats, referenced by 3D model formats or material definitions, and assembled into resource bundles.

At step 790, the process sends the manipulated video feed to user 2 340's computer system 345 and FIG. 7 processing thereafter ends at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    initiating a video conference between a first user utilizing a first device and a second user utilizing a second device, wherein the first device uses a camera positioned at a first set of coordinates to capture a first live video feed of the first user from a first alignment perspective, and wherein the first device displays a second live video feed of the second user on the screen;
    identifying a set of eyes of the second user in the second live video feed based on performing facial recognition on the second live video feed;
    computing a pupillary distance between the identified set of eyes;
    determining, based on the pupillary distance, a second set of coordinates between the identified set of eyes of the second user;
    manipulating the first live video feed such that the manipulated first live video feed captures the first user from a second alignment perspective corresponding to the second set of coordinates; and
    transmitting the manipulated first live video feed to the second device.

2. The method of claim 1 wherein the second set of coordinates is relative to a corner of the screen, the method further comprising:
    displaying, by the first device, the second live video feed in a viewport window on the screen;
    determining the first set of coordinates of the camera relative to the corner of the screen;
    computing an offset between the first set of coordinates and the second set of coordinates; and
    performing the manipulating of the first live video feed based on the offset.

3. The method of claim 2 further comprising:
    setting a virtual camera at the first set of coordinates;
    transposing the virtual camera from the first set of coordinates to the second set of coordinates based on the offset; and
    utilizing the transposed virtual camera as a basis to perform the manipulating of the first live video feed.

4. The method of claim 2 further comprising:
    building a mesh model of the first user's face based on the first live video feed taken by the camera at the first alignment perspective;
    transforming the mesh model from the first alignment perspective to the second alignment perspective;
    overlaying a texture map corresponding to the first user onto the transformed mesh model; and
    applying the transformed mesh model with the texture mapped overlay into the first live video stream.

5. The method of claim 4 further comprising:
    in response to the transforming the mesh model, continuing to manipulate the first live video stream during the video conference, wherein the manipulating further comprises:

capturing, by the camera, a set of head movements of the first user; and utilizing a set of rotation matrices corresponding to the offset to rotate an alignment perspective of the set of head movements.

6. The method of claim 1 further comprising:

adding a third user utilizing a third device to the video conference, wherein the first device displays a third live video feed of the third user on the screen at a third set of coordinates;

in response to detecting that the third user is speaking during the video conference:

re-manipulating the first live video feed such that the re-manipulated first live video feed captures the first user from a third alignment perspective corresponding to the third set of coordinates; and transmitting the re-manipulated first live video feed to the second device and the third device.

7. The method of claim 1 further comprising:

maintaining the manipulating of the first live video feed at the second alignment perspective in response to the first user looking away from the first live video feed during the video conference.

8. An information handling system comprising:

one or more processors;

a memory coupled to at least one of the processors;

a set of computer program instructions stored in the memory and executed by at least one of the processors in order to perform actions of:

initiating a video conference between a first user utilizing a first device and a second user utilizing a second device, wherein the first device uses a camera positioned at a first set of coordinates to capture a first live video feed of the first user from a first alignment perspective, and wherein the first device displays a second live video feed of the second user on the screen;

identifying a set of eyes of the second user in the second live video feed based on performing facial recognition on the second live video feed;

computing a pupillary distance between the identified set of eyes;

determining, based on the pupillary distance, a second set of coordinates between the identified set of eyes of the second user;

manipulating the first live video feed such that the manipulated first live video feed captures the first user from a second alignment perspective corresponding to the second set of coordinates; and transmitting the manipulated first live video feed to the second device.

9. The information handling system of claim 8 wherein the second set of coordinates is relative to a corner of the screen, the method, and wherein the processors perform additional actions comprising:

displaying, by the first device, the second live video feed in a viewport window on the screen;

setting the second set of coordinates as a location in the viewport window between the second user's eyes based on a pupillary distance, wherein the second set of coordinates is relative to a corner of the screen;

determining the first set of coordinates of the camera relative to the corner of the screen;

computing an offset between the first set of coordinates and the second set of coordinates; and performing the manipulating of the first live video feed based on the offset.

10. The information handling system of claim 9 wherein the processors perform additional actions comprising:

setting a virtual camera at the first set of coordinates;

transposing the virtual camera from the first set of coordinates to the second set of coordinates based on the offset; and utilizing the transposed virtual camera as a basis to perform the manipulating of the first live video feed.

11. The information handling system of claim 9 wherein the processors perform additional actions comprising:

building a mesh model of the first user's face based on the first live video feed taken by the camera at the first alignment perspective;

transforming the mesh model from the first alignment perspective to the second alignment perspective;

overlaying a texture map corresponding to the first user onto the transformed mesh model; and applying the transformed mesh model with the texture mapped overlay into the first live video stream.

12. The information handling system of claim 11 wherein the processors perform additional actions comprising:

in response to the transforming the mesh model, continuing to manipulate the first live video stream during the video conference, wherein the manipulating further comprises:

capturing, by the camera, a set of head movements of the first user; and utilizing a set of rotation matrices corresponding to the offset to rotate an alignment perspective of the set of head movements.

13. The information handling system of claim 8 wherein the processors perform additional actions comprising:

adding a third user utilizing a third device to the video conference, wherein the first device displays a third live video feed of the third user on the screen at a third set of coordinates;

in response to detecting that the third user is speaking during the video conference:

re-manipulating the first live video feed such that the re-manipulated first live video feed captures the first user from a third alignment perspective corresponding to the third set of coordinates; and transmitting the re-manipulated first live video feed to the second device and the third device.

14. The information handling system of claim 8 wherein the processors perform additional actions comprising:

maintaining the manipulating of the first live video feed at the second alignment perspective in response to the first user looking away from the first live video feed during the video conference.

15. A computer program product stored in a computer readable storage medium, comprising computer program code that, when executed by an information handling system, causes the information handling system to perform actions comprising:

initiating a video conference between a first user utilizing a first device and a second user utilizing a second device, wherein the first device uses a camera positioned at a first set of coordinates to capture a first live video feed of the first user from a first alignment perspective, and wherein the first device displays a second live video feed of the second user on the screen;

identifying a set of eyes of the second user in the second live video feed based on performing facial recognition on the second live video feed;

computing a pupillary distance between the identified set of eyes;

determining, based on the pupillary distance, a second set of coordinates between the identified set of eyes of the second user;

manipulating the first live video feed such that the manipulated first live video feed captures the first user from a second alignment perspective corresponding to the second set of coordinates; and transmitting the manipulated first live video feed to the second device.

16. The computer program product of claim 15 wherein the second set of coordinates is relative to a corner of the screen, and wherein the information handling system performs further actions comprising:

displaying, by the first device, the second live video feed in a viewport window on the screen;

determining the first set of coordinates of the camera relative to the corner of the screen;

computing an offset between the first set of coordinates and the second set of coordinates; and performing the manipulating of the first live video feed based on the offset.

17. The computer program product of claim 16 wherein the information handling system performs further actions comprising:

setting a virtual camera at the first set of coordinates;

transposing the virtual camera from the first set of coordinates to the second set of coordinates based on the offset; and utilizing the transposed virtual camera as a basis to perform the manipulating of the first live video feed.

18. The computer program product of claim 16 wherein the information handling system performs further actions comprising:

building a mesh model of the first user's face based on the first live video feed taken by the camera at the first alignment perspective;

transforming the mesh model from the first alignment perspective to the second alignment perspective;

overlaying a texture map corresponding to the first user onto the transformed mesh model; and applying the transformed mesh model with the texture mapped overlay into the first live video stream.

19. The computer program product of claim 18 wherein the information handling system performs further actions comprising:

in response to the transforming the mesh model, continuing to manipulate the first live video stream during the video conference, wherein the manipulating further comprises:

capturing, by the camera, a set of head movements of the first user; and utilizing a set of rotation matrices corresponding to the offset to rotate an alignment perspective of the set of head movements.

20. The computer program product of claim 15 wherein the information handling system performs further actions comprising:

adding a third user utilizing a third device to the video conference, wherein the first device displays a third live video feed of the third user on the screen at a third set of coordinates;

in response to detecting that the third user is speaking during the video conference:

re-manipulating the first live video feed such that the re-manipulated first live video feed captures the first user from a third alignment perspective corresponding to the third set of coordinates; and transmitting the re-manipulated first live video feed to the second device and the third device.

* * * * *